United States Patent Office 3,563,896
Patented Feb. 16, 1971

3,563,896
PROCESS FOR ALKYLATING VINYL AROMATIC HYDROCARBON POLYMERS AND MAKING LUBRICATING OIL VISCOSITY IMPROVERS
Robert H. Allen, Midland, Mich., assignor to The Dow Chemical Company, Midland, Mich., a corporation of Delaware
No Drawing. Filed Jan. 15, 1968, Ser. No. 697,590
Int. Cl. C10m *1/18*
U.S. Cl. 252—59                5 Claims

ABSTRACT OF THE DISCLOSURE

The invention concerns a process for alkylating vinyl aromatic polymers to form oil soluble products suitable for use as viscosity index improver for lubricating oils.

---

This invention concerns a process for alkylating vinyl aromatic hydrocarbon polymers to make lubricating oil additives. It relates more particularly to a process for alkylating polystyrene to form oil soluble products suitable for use as viscosity index improvers for lubricating oils.

It has now been discovered that alkylated polystyrene suitable for use as viscosity index improvers for lubricating oils can readily be prepared by alkylating polystyrene with tertiary alkyl chlorides or bromides having from 4 to 8 carbon atoms in the presence of aluminum chloride or aluminum bromide as catalyst while having the polystyrene dissolved in an inert solvent, as more fully hereinafter described.

The polystyrene to be employed in the process can have a molecular weight between about 75,000 and 750,000, preferably from 100,000 to 600,000, and preferably has a narrow molecular weight distribution, e.g. a weight average molecular weight $M_w$ to number average molecular weight $M_n$ ratio of from about 1.02:1 to 1.8:1. Narrow molecular weight polystyrene can readily be prepared by the anionic polymerization of monomeric styrene in an inert organic solvent using an alkyl lithium, lithium based catalyst, or an alkali metal complex as the polymerization initiator.

The tertiary alkyl halide can be tertiary butyl bromide, tertiary butyl chloride, tertiary amyl chloride, tertiary hexyl chloride, tertiary heptyl chloride, tertiary octyl chloride and the corresponding tertiary alkyl bromides but is preferably the chloride. It is caused to react with the polystyrene in an inert solvent and reaction medium such as cyclohexane, chlorobenzene, dichlorobenzene, perchloroethylene, or mixtures thereof, at temperatures between about 20 and 100° C., preferably 20 to 80° C., in the presence of anhydrous or substantially anhydrous aluminum chloride or aluminum bromide as catalyst and a small amount of nitrobenzene. The tertiary butyl halide can be used in amounts corresponding to from about 0.75 to 1.25, preferably from about 0.8 to 1.1, gram molecular proportion of said tertiary butyl halide per chemically equivalent aromatic nucleus in the polystyrene starting material, and is reacted with said tertiary butyl halide in approximately said proportions in order to obtain oil soluble alkylated polystyrene products suitable for use as lubricating oil additives.

The aluminum halide can be used in amounts corresponding to from about 0.75 to 3, preferably from about 1 to 2, percent by weight of the polystyrene starting material, and is preferably employed as a solution of the aluminum halide dissolved in from three to five or more parts by weight of nitrobenzene per part of the aluminum halide.

In practice, polystyrene of narrow molecular weight distribution is dissolved in cyclohexane, or a mixture of cyclohexane and heptane to form a solution containing from 20 to 30 weight percent of said polystyrene. Anhydrous aluminum chloride dissolved in from 3 to 5 times or more its weight of nitrobenzene is added in amount corresponding to from 0.75 to 3 percent by weight of the polystyrene initially used. The mixture is stirred and the tertiary alkyl halide, e.g. tertiary butyl chloride, is added at about the rate it is reacted until an amount of chloride or bromide corresponding to from 0.75 to 1.25 gram mole thereof per chemically equivalent aromatic nucleus in the polymer is reacted. Thereafter, the reaction mixture is contacted with water to kill the aluminum halide catalyst and after which the alkylated polymer can be recovered in usual ways, e.g. the alkylated polystyrene product can be precipitated by pouring the reacted mixture into methyl alcohol and separating and washing and drying the product in usual ways.

In an alternative procedure the alkylated polystyrene can be recovered by contacting the reacted mixture with water to kill the aluminum halide catalyst, separating the aqueous and the organic layers and diluting or mixing the organic layer with lubricating oil, then heating said mixture to distill and separate volatile inert solvent from the oil containing the alkylated polystyrene dissolved therein.

In a preferred embodiment the invention contemplates an integrated process which comprises the steps of (a) polymerizing monomeric styrene in a hydrocarbon solvent, e.g. cyclohexane, using a lithium based catalyst to make a soluble or linear polystyrene of narrow molecular weight, (b) alkylating the polystyrene in the solvent in which it is prepared by reacting said polystyrene with a tertiary alkyl chloride having from 4 to 8 carbon atoms, e.g. tertiary butyl chloride, at temperatures between 20° and 80° C. in the presence of aluminum chloride and a small amount of nitrobenzene, (c) contacting the alkylated reaction mixture with water to kill the activity of the aluminum chloride and separating the aqueous and the organic layers, (d) mixing the organic layer with lubricating oil and heating said mixture at elevated temperatures and at subatmospheric pressures, to distill and separate volatile ingredients, and recover the alkylated polystyrene dissolved in the lubricating oil as residue. The residue comprising the oil soluble alkylated polystyrene concentrate can be used directly as a viscosity improver, or additive for lubricating oils.

The following examples illustrate ways in which the principle of the invention has been applied, but are not to be construed as limiting its scope.

EXAMPLE 1

A solution consisting of 150 grams of polystyrene of narrow molecular weight, i.e. having a weight average molecular weight of about $M_w=193,000$ and a number average molecular weight of about $M_n=182,000$, was dissolved in 450 grams of cyclohexane. The solution was placed in a glass reaction flask equipped with a dropping funnel, a reflux condenser and stirrer. The solution was stirred at room temperature (about 25° C.). A charge of 12 ml. of a solution consisting of one part by weight of anhydrous aluminum chloride dissolved in five parts by weight of nitrobenzene was added. Stirring of the mixture was continued while adding 150 grams of t-butyl chloride thereto over a period of 2 hours. Stirring of the mixture was continued for 2 hours longer. Thereafter, 25 grams of t-butyl chloride was added. The mixture was stirred for 1 hour. The mixture was stirred with about 500 ml. of water to remove the aluminum chloride catalyst. The organic layer was separated. It was mixed with methyl alcohol. The polymer precipitated. The polymer was separated, washed and dried. There was obtained 214 grams of alkylated polystyrene product. It was analyzed by infrared and found to contain 0.95 p-t-butyl group per aromatic nucleus in the polystyrene.

EXAMPLE 2

A narrow molecular weight polystyrene having a weight average molecular weight of about $Mw=267,000$ and a number average molecular weight of about $Mn=247,000$, was reacted with t-butyl chloride employing procedure similar to that used in Example 1. There was obtained 205 grams of alkylated polystyrene containing 0.90 p-t-butyl group per aromatic nucleus. A commercial 165 SUS neutral lubricating oil containing 1.5 weight percent of the above alkylated polystyrene had a viscosity of 10.5 centistokes at 210° F. Viscosity loss on shear after use in a single cylinder engine for 7 hours was about 10 percent.

EXAMPLE 3

Example 1 was repeated except using 1000 grams of the solution of polystyrene and 187 grams of t-butyl chloride. There was obtained 340 grams of alkylated polystyrene having 0.75 p-t-butyl group per aromatic nucleus.

A commercial 165 SUS neutral lubricating oil containing 1.9 weight percent of the alkylated polystyrene had a viscosity of 10.5 centistokes at 210° F. Viscosity loss on shear was only 5.0 percent.

EXAMPLE 4

(A) Through a tubular reactor at 135° C. was pumped at a rate of 26 pounds per hour, a 24 weight percent solution of styrene in cyclohexane and 18 ml./hr. of 15 percent butyl lithium in heptane solution. The reaction time was about 25 minutes. The reacted solution contained 23.8 percent by weight of polystyrene of narrow molecular weight by analysis.

(B) To a charge of 200 grams of the solution of polystyrene prepared in part (A) above, there was added 4 ml. of a solution of one part by weight anhydrous aluminum chloride and 5 parts by weight of nitrobenzene, and 15 grams of t-butyl chloride. The resulting mixture was stirred at room temperature for 45 minutes. No reaction occurred. Thereafter, 2 ml. more of the AlCl$_3$/nitrobenzene solution was added. This initiated an alkylation reaction. Stirring of the mixture was continued at room temperature while adding 35 grams of t-butyl chloride over a period of one hour. After 0.5 hour longer, 10 grams of t-butyl chloride was added. Stirring was continued for 1.5 hours longer. The alkylated polymer product was recovered employing procedure similar to that employed in Example 1. There was obtained 71.4 grams of alkylated polystyrene containing 0.85 p-t-butyl group per aromatic nucleus, by analysis.

A commercial 165 SUS neutral lubricating oil containing 1.5 weight percent of the alkylated polystyrene had a viscosity of 10.5 centistokes at 210° F. Viscosity loss on shear was 7.9 percent.

EXAMPLE 5

A charge of 600 grams of a batch of a solution of narrow molecular weight polystyrene prepared by polymerizing styrene in cyclohexane with normal butyl lithium as catalyst employing procedure similar to that used in part (A) of Example 3, and which solution contained 23.8 percent by weight of polystyrene was placed in a reaction vessel equipped with a reflux condenser and stirrer. The mixture was stirred. A change of 20 ml. of a solution of 1 part by weight of anhydrous aluminum chloride and 5 parts by weight of nitrobenzene was added. Thereafter, 150 grams of t-butyl chloride was added dropwise over a period of 1.5 hours. Stirring at room temperature was continued. After one hour 30 grams more of t.-butyl chloride was added. After 1.5 hours longer 30 grams more of t-butyl chloride was added. The resulting mixture was stirred and allowed to react for 2 hours longer. The reacted mixture was stirred with 500 ml. of water and the aqueous and organic layers were separated. The aqueous layer was discarded. The organic layer was washed with water, then with a dilute aqueous solution of sodium carbonate. The organic layer was mixed with 543 grams (about an equal weight of 90 SUS neutral lubricating oil). The mixture was heated at atmospheric pressure to a pot temperature of 170° C. while distilling volatile ingredients boiling up to 100° C. Thereafter, the residue was heated in vacuum at an absolute pressure of 10 millimeters of mercury to a pot temperature of 195° C. while distilling volatile ingredients boiling up to 165° C. at 10 mm. There was obtained 680 grams of residue consisting of the lubricating oil containing 24 percent by weight of alkylated polystyrene having 0.95 p-t-butyl alkyl group per aromatic nucleus as viscosity improver additive concentrate. A commercial 165 SUS neutral lubricating oil containing 1.5 weight percent of the alkylated polystyrene had a viscosity of 10.5 centistokes at 210° F. Viscosity loss on shear was 8.8 percent.

EXAMPLE 6

A charge of 200 grams of a 25 weight percent solution of polystyrene, prepared by polymerizing monomeric styrene in cyclohexane at about room temperature using n-butyl lithium as catalyst, was placed in a glass reaction vessel equipped with a reflux condenser and stirrer. The solution was stirred. A charge of 8 ml. of a solution of 1 part by weight of anhydrous aluminum chloride and 5 parts by weight nitrobenzene was added. Thereafter, the mixture was stirred and maintained at 70°–80° C. while adding thereto 50 g. of t-butyl chloride over a period of 0.5 hour. After 40 minutes 10 ml. more of t-butyl chloride were added. After one hour 50 ml. of water was added. The polymer was precipitated by pouring the reaction mixture into methyl alcohol. It was separated by filtering and was washed and dried. There was obtained 71.2 grams of alkylated polystyrene product having 0.8 t-butyl group per aromatic nucleus by analysis. The alkylated polystyrene was soluble in lubricating oil and was a good viscosity improver for piston driven gasoline engine lubricating oil.

EXAMPLE 7

A charge of 400 grams of a 23.8 weight percent solution of polystyrene, prepared by polymerizing styrene in cyclohexane at room temperature using n-butyl lithium as catalyst was placed in a stainless steel pressure resistant reaction vessel equipped with a stirrer, 10 ml. of a solution of 1 part by weight of anhydrous aluminum chloride and 5 parts by weight of nitrobenzene was added. Thereafter, the mixture was stirred and heated to 100° C. A charge of 120 ml. of tert.-butyl chloride was added under pressure. The resulting mixture was stirred and heated in the pressure resistant vessel at 100° C. for twenty minutes. A pressure of 143 p.s.i. was had in the vessel. The vessel was cooled in ice water, was vented, then opened and the catalyst deactivated with water. The polymer was precipitated by pouring the mixture into a stirred body of methyl alcohol. The precipitated polymer was separated and was washed and dried. There was obtained 139.8 grams of alkylated polystyrene product. It was analyzed and found to contain 0.70 tert-butyl group per aromatic nucleus. A commercial 165 SUS neutral lubricating oil containing 1.65 weight percent of the alkylated polystyrene had a viscosity of 10.5 centistokes at 210° F. Viscosity loss on shear of said oil was 18 percent.

EXAMPLE 8

A charge of 200 grams of a 23.8 weight percent solution of polystyrene, similar to that employed in Example 7, was placed in a glass reaction vessel equipped with a reflux condenser and stirrer. 8 ml. of a solution of 1 part by weight aluminum chloride and 5 parts nitrobenzene was added. The mixture was stirred at room temperature. A charge of 60 grams of tert.-amyl chloride was added. The resulting mixture was stirred at room temperature for 6 hours. Twelve grams more of tert.-amyl chloride were added. The mixture was stirred for 6 hours. Thereafter, the polymer was recovered. There was obtained 74.1 grams of alkylated polystyrene having 0.75 tert.-amyl group per aromatic nucleus. A commercial 165 SUS neutral lubricating oil containing 1.5 weight percent of the alkylated polystyrene had a viscosity of 10.5 centistokes at 210° F. Viscosity loss on shear at 210° F. was 9.4 percent.

Similar results are obtained when tertiary hexyl chloride, tertiary heptyl chloride, tertiary octyl chloride or tertiary butyl amyl, hexyl, heptyl or octyl bromide are substituted for the tertiary butyl and tertiary amyl chloride used in the above examples.

I claim:

1. A process for producing a lubricating oil having improved viscosity which comprises reacting tertiary alkyl halides having from 4 to 8 carbon atoms with polystyrene having a molecular weight between 75,000 and 750,000 and a narrow molecular weight distribution ratio of $M_w$ to $M_n$ of from 1.02:1 to 1.8:1, at temperature between 20° and 80° C. in the presence of from 0.75 to 3 percent by weight of aluminum halide based on the weight of the polystyrene and nitrobenzene in amount corresponding to from 3 to 10 times the weight of said aluminum halide, in an inert hydrocarbon solvent, said tertiary alkyl halide being reacted in amount corresponding to from 0.75 to 1.25 gram mole per aromatic nucleus in said polystyrene, contacting said reacted mixture with water and separating the aqueous and organic layers, mixing the organic layer with lubricating oil and heating the mixture at elevated temperatures and subatmospheric pressure while vaporizing and separating volatile ingredients and recovering the alkylated polystyrene as a concentrate dissolved in said lubricating oil.

2. The process according to claim 1 wherein the tertiary alkyl halide is tertiary butyl chloride and the aluminum halide is aluminum chloride.

3. The process according to claim 1 wherein the tertiary alkyl halide is tertiary amyl chloride.

4. A process for producing a lubricating oil having improved viscosity which comprises the steps of:

(1) reacting a tertiary alkyl halide having from 4 to 8 carbon atoms with polystyrene having a molecular weight between 75,000 and 750,000 and a narrow molecular weight distribution ratio of $M_w$ to $M_n$ of from 1.02:1 to 1.8:1 at temperatures between 20° and 100° C. in the presence of from about 0.75 to about 4 weight percent of an aluminum halide based on the weight of polystyrene in an inert hydrocarbon solvent, said tertiary alkyl halide being caused to react with said polystyrene in amount corresponding to from 0.75 to 1.25 gram molecular weight proportion per aromatic nucleus in said polystyrene;

(2) contacting the resulting reacted mixture with water and separating the resulting aqueous and organic layers;

(3) recovering the resulting alkylated polystyrene from the organic layer; and (4) dissolving said alkylated polystyrene in a lubricating oil.

5. The process according to claim 4 wherein the alkylated polystyrene is recovered by precipitating said alkylated polystyrene from the organic layer and collecting, washing and drying the precipitate.

References Cited

UNITED STATES PATENTS

| | | | |
|---|---|---|---|
| 2,545,522 | 3/1951 | Lieber | 252—59X |
| 2,569,400 | 9/1951 | Butler | 252—59X |
| 2,603,627 | 7/1952 | Garber et al. | 252—59X |
| 3,157,624 | 11/1964 | Vries et al. | 252—59X |
| 3,318,813 | 5/1967 | McCormick et al. | 252—59 |

DANIEL E. WYMAN, Primary Examiner

W. H. CANNON, Assistant Examiner

U.S. Cl. X.R.

260—93.5